United States Patent
Luna Olvera et al.

(10) Patent No.: US 10,246,900 B2
(45) Date of Patent: Apr. 2, 2019

(54) SYSTEM FOR IDENTIFYING THE LOCATION OF A HIDDEN CLOSURE LATCH RELEASE ON A MOTOR VEHICLE

(71) Applicant: FORD GLOBAL TECHNOLOGIES, LLC, Dearborn, MI (US)

(72) Inventors: Ricardo David Luna Olvera, Mexico City (MX); Gerardo Brigido Delgado, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 15/137,619

(22) Filed: Apr. 25, 2016

(65) Prior Publication Data
US 2017/0306647 A1 Oct. 26, 2017

(51) Int. Cl.
E05B 17/10 (2006.01)
E05B 81/76 (2014.01)
E05B 83/18 (2014.01)
B60Q 1/26 (2006.01)

(52) U.S. Cl.
CPC ............... *E05B 17/10* (2013.01); *B60Q 1/26* (2013.01); *E05B 81/76* (2013.01); *E05B 83/18* (2013.01)

(58) Field of Classification Search
CPC . B60Q 1/30; E05B 17/10; E05B 83/18; G09F 21/04
USPC ............ 116/28 R; 40/591, 593; 70/258, 454, 70/DIG. 59; 296/21, 76; 340/426.29, 340/468
See application file for complete search history.

(56) References Cited

U.S. PATENT DOCUMENTS

| | | | | |
|---|---|---|---|---|
| 2,188,264 A | * | 1/1940 | Frodyce | E05B 17/106 250/466.1 |
| 2,566,490 A | * | 9/1951 | Heinz | E05B 17/106 250/465.1 |
| 2,632,266 A | * | 3/1953 | Sellwood | E05B 15/08 116/205 |
| 2,941,392 A | * | 6/1960 | Byrne | E05B 15/08 70/454 |
| 3,270,191 A | * | 8/1966 | Hilliard | E05B 17/10 362/100 |
| 4,928,212 A | | 5/1990 | Benavides | |
| 5,101,755 A | * | 4/1992 | Barrett | E01F 9/541 116/209 |
| 6,191,682 B1 | * | 2/2001 | Wolfgang | B60R 25/2063 200/61.45 R |
| 6,209,933 B1 | | 4/2001 | Ang et al. | |
| 6,349,984 B1 | | 2/2002 | Marrazzo et al. | |
| 6,369,395 B1 | | 4/2002 | Roessler | |
| 6,460,906 B2 | * | 10/2002 | Bingle et al. | E05B 83/26 292/336.3 |
| 6,568,739 B1 | * | 5/2003 | Burch | B60R 13/10 296/100.06 |
| 6,692,056 B2 | | 2/2004 | Bingle et al. | |
| 6,929,294 B2 | | 8/2005 | Byrla et al. | |

(Continued)

*Primary Examiner* — R. A. Smith
(74) *Attorney, Agent, or Firm* — Jason Rogers; Vichit Chea; King & Schickli, PLLC

(57) ABSTRACT

A system is provided for easily locating a closure latch release and opening a closure of a motor vehicle. That system includes the closure latch release which may be hidden from view by a body element of the motor vehicle and a highlight feature adjacent the closure latch release that is in clear or plain view so that the closure latch release may be quickly and conveniently located.

20 Claims, 3 Drawing Sheets

(56) References Cited

U.S. PATENT DOCUMENTS

| | | | |
|---|---|---|---|
| 7,841,641 B2* | 11/2010 | Ohzono | B62J 17/02 296/1.08 |
| 8,156,671 B2 | 4/2012 | Presley et al. | |
| 8,683,722 B1* | 4/2014 | Cowan | G09F 21/04 40/543 |
| 2004/0160760 A1 | 8/2004 | Tibbenham et al. | |
| 2005/0193788 A1* | 9/2005 | Weiner | E05B 17/106 70/454 |
| 2007/0267489 A1* | 11/2007 | Borodulin | E05B 47/0002 235/382 |
| 2009/0243329 A1* | 10/2009 | Hustyi et al. | B60J 1/1846 296/76 |
| 2015/0138796 A1* | 5/2015 | Salter et al. | B60Q 1/0011 362/510 |
| 2016/0145910 A1* | 5/2016 | Beck et al. | E05B 79/04 70/455 |
| 2017/0305333 A1* | 10/2017 | Delgado et al. | B60Q 1/2607 |
| 2018/0029528 A1* | 2/2018 | Gawade et al. | B60Q 1/2669 |

* cited by examiner

SYSTEM FOR IDENTIFYING THE LOCATION OF A HIDDEN CLOSURE LATCH RELEASE ON A MOTOR VEHICLE

TECHNICAL FIELD

This document relates generally to the motor vehicle equipment field and, more particularly, to a system and method for locating a hidden closure latch release on a motor vehicle.

BACKGROUND

Many motor vehicles currently in production include a closure latch release, commonly in the form of a hidden button. When the motor-vehicle-specific key is in the proximity of the motor vehicle, that button is depressed in order to release a closure latch and open the closure. On many models this closure latch release is hidden or concealed from view underneath a motor vehicle sill or other body element and the end user may have some difficulty locating the closure latch release each time he seeks to open the closure. This document relates to a system whereby the closure latch release may be easily located when concealed from view.

SUMMARY

In accordance with the purposes and benefits described herein, a system is provided for opening a closure of a motor vehicle. That system comprises a closure latch release and a highlight feature adjacent the closure latch release whereby the closure latch release may be easily located. Thus, in some embodiments the closure latch release is hidden from view by a body element of the motor vehicle and the highlight feature is in clear view.

The highlight feature may be luminescent. The highlight feature may be phosphorescent. The highlight feature may be a paint. The highlight feature may also be an adhesive sticker.

The closure may be a trunk lid. The closure may be a hatchback lid. The closure may be a liftgate such as found on a sport utility vehicle.

In accordance with an additional aspect, a motor vehicle is provided. That motor vehicle comprises a body including a closure and a body element. In addition, the motor vehicle includes a closure latch release carried on the body and hidden from view by the body element. Further, the motor vehicle includes a highlight feature carried in clear view on the body adjacent the closure latch release.

The highlight feature may be luminescent or phosphorescent. The highlight feature may be a paint or an adhesive sticker.

As previously noted, the closure may be a trunk lid, a hatchback lid or a liftgate.

In accordance with still another aspect, a method is provided of identifying a location of a hidden closure latch release on a motor vehicle. That method may be broadly described as comprising the step of providing a highlight feature in plain view on the motor vehicle adjacent the hidden closure latch release. Further, the method may include using a paint for the highlight feature. Alternatively, the method may include using an adhesive sticker for the highlight feature.

In the following description, there are shown and described several preferred embodiments of the system, motor vehicle and method. As it should be realized, the system, motor vehicle and method are capable of other, different embodiments and their several details are capable of modification in various, obvious aspects all without departing from the system, motor vehicle and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the system, motor vehicle and method and together with the description serve to explain certain principles thereof. In the drawing figures.

Reference will now be made in detail to the present preferred embodiments of the system, motor vehicle and method, examples of which are illustrated in the accompanying drawing figures.

DETAILED DESCRIPTION

Figure 1:
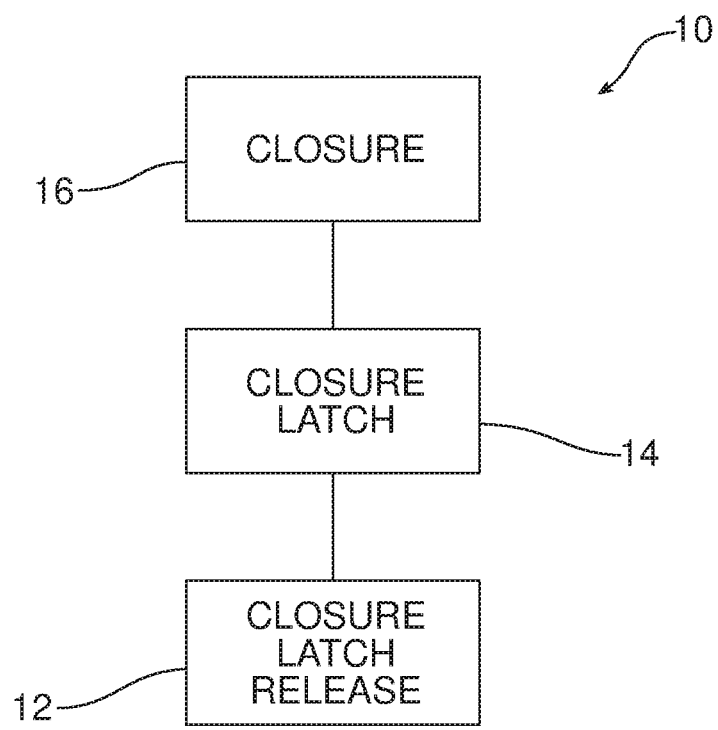
FIG. 1 is a schematic block diagram illustrating the closure, the closure latch and the closure latch release.
Figure 2:
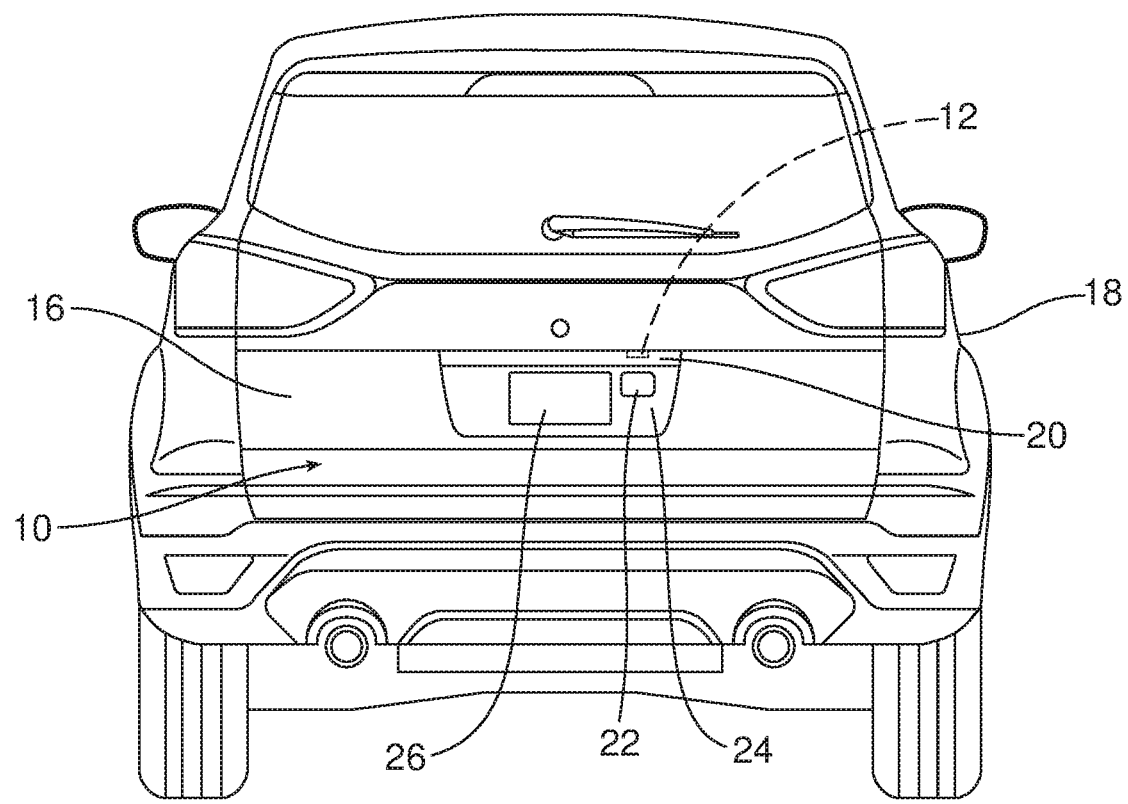
FIG. 2 is a rear elevational view of a motor vehicle equipped with a system for easily locating a hidden closure latch release on a motor vehicle.
Figure 3:
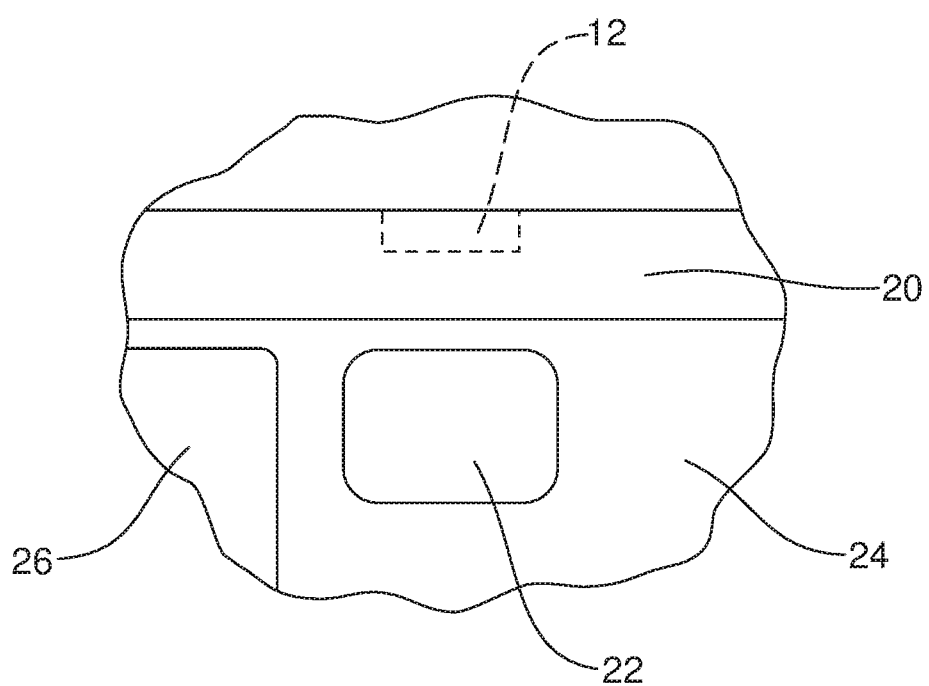
FIG. 3 is a detailed rear elevational view showing the closure latch release hidden behind a body element of the motor vehicle and a highlight feature provided in plain view on the body of the motor vehicle adjacent the closure latch release.

Reference is now made to FIGS. 1-3 illustrating the user-friendly system 10 for more easily and conveniently locating a closure latch release 12 so as to release a closure latch 14 and allow the opening of the closure 16 of the motor vehicle 18. In the illustrated embodiments, the closure latch release 12 is depressed in order to release the closure latch 14 and open the closure 16. As best illustrated in FIG. 3, the closure latch release 12 is concealed or hidden from view behind a sill or other body element 20 of the motor vehicle 18.

In FIG. 2, the closure 16 comprises a liftgate. It should be appreciated, however, that the closure 16 may comprise substantially any closure found on a motor vehicle 18 including, but not necessarily limited to, a trunk lid, a hatchback lid and the illustrated liftgate.

As illustrated in FIGS. 2 and 3, the system 10 also includes a highlight feature 22. The highlight feature 22 is provided on the body 24 of the motor vehicle 18 near the license plate 26 and adjacent the closure latch release 12 where it is in full and plain view.

As one approaches the motor vehicle 18, the highlight feature 22 is visually apparent and provides the end user with a visual point of reference for locating the closure latch release 12 that is hidden from view by the body element 20. Note in the illustrated embodiment that the highlight feature 22 is provided immediately below the closure latch release 12.

The highlight feature 22 may comprise substantially any feature capable of providing an end user with a visual indication of the location of the hidden closure latch release 12. In one possible embodiment, the highlight feature 22 is luminescent. In another possible embodiment the highlight feature 22 is phosphorescent. In some embodiments, the highlight feature is a paint such as a luminescent paint, a phosphorescent paint or a retro reflective paint. In other embodiments the highlight feature 22 may comprise an adhesive sticker with luminescent, phosphorescent or reflective properties suited for the identification of the location of the closure latch release 12 even in relatively low light conditions.

In summary, numerous benefits are provided by the system 10. The highlight feature 22 provides a clearly visible indication to the end user of the position of the hidden closure latch release 12. Thus, the end user no longer needs to blindly feel around under the body element 20 for the closure latch release 12 and may conveniently and easily locate the closure latch release in order to release the closure latch 14 and open the closure 16. Such a convenient feature 22 is greatly appreciated and is particularly beneficial when an end user is carrying one or more items such as shopping bags and is seeking to open the closure 16 in inclement weather conditions.

The foregoing has been presented for purposes of illustration and description. It is not intended to be exhaustive or to limit the embodiments to the precise form disclosed. Obvious modifications and variations are possible in light of the above teachings. For example, the highlight feature 22 could also comprise a light source such as a pinpoint light emitting diode located adjacent to the closure latch release 12 at a plainly visible location on the body 24 of the motor vehicle 18. All such modifications and variations are within the scope of the appended claims when interpreted in accordance with the breadth to which they are fairly, legally and equitably entitled.

What is claimed:

1. A system for opening a closure of a motor vehicle, comprising:
    a closure latch release hidden from view; and
    a highlight feature on a body of the motor vehicle adjacent said closure latch release and dedicated to locating said closure latch release whereby said closure latch release may be easily located.

2. The system of claim 1, wherein said closure latch release is hidden from view by a body element of said motor vehicle and said highlight feature is in clear view.

3. The system of claim 2, wherein said highlight feature is luminescent.

4. The system of claim 2, wherein said highlight feature is phosphorescent.

5. The system of claim 2, wherein said highlight feature is a paint.

6. The system of claim 2, wherein said highlight feature is an adhesive sticker.

7. The system of claim 1, wherein said closure is a trunk lid.

8. The system of claim 1, wherein said closure is a hatchback lid.

9. The system of claim 1, wherein said closure is a liftgate.

10. A motor vehicle, comprising:
    a body including a closure and a body element;
    a closure latch release carried on said body and hidden from view by said body element; and
    a highlight feature carried in clear view on said body adjacent said closure latch release and dedicated to locating said closure latch release.

11. The motor vehicle of claim 10, wherein said highlight feature is luminescent.

12. The motor vehicle of claim 10, wherein said highlight feature is phosphorescent.

13. The motor vehicle of claim 10, wherein said highlight feature is paint.

14. The motor vehicle of claim 10, wherein said highlight feature is an adhesive sticker.

15. The motor vehicle of claim 10, wherein said closure is a trunk lid.

16. The motor vehicle of claim 10, wherein said closure is a hatchback lid.

17. The motor vehicle of claim 10, wherein said closure feature is a liftgate.

18. A method of identifying a location of a hidden closure latch release on a motor vehicle, comprising:
    providing a highlight feature in plain view on said motor vehicle adjacent said hidden closure latch release wherein said highlight feature is dedicated to locating said closure latch release.

19. The method of claim 18, including using a paint for said highlight feature.

20. The method of claim 18, including using an adhesive sticker for said highlight feature.

* * * * *